(No Model.)
F. L. McGAHAN.
PIPE COUPLING.
No. 336,129. Patented Feb. 16, 1886.
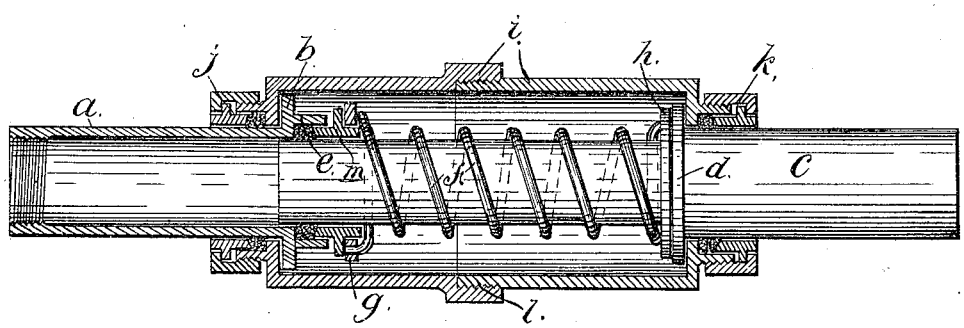
WITNESSES:
W. H. Neff
M. Carsten
INVENTOR:
Fred. L. McGahan
By H. P. Hood
Atty.

UNITED STATES PATENT OFFICE

FRED L. McGAHAN, OF INDIANAPOLIS, INDIANA.

PIPE-COUPLING.

SPECIFICATION forming part of Letters Patent No. 336,129, dated February 16, 1886.

Application filed May 16, 1884. Serial No. 131,716. (No model.)

*To all whom it may concern:*

Be it known that I, FRED L. McGAHAN, a citizen of the United States, residing at Indianapolis, county of Marion, and State of Indiana, have invented a new and useful Improved Pipe-Coupling, of which the following is a specification.

My invention relates to an improved means for coupling together the ends of pipe.

The objects of my improvement are to provide a flexible expansion-joint which shall be more secure and durable than those made heretofore, and in which the expansion of the pipes shall operate to tighten the packing around the joint, all as hereinafter fully described.

The accompanying drawing illustrates my invention.

The figure represents a longitudinal section of my improved coupling.

$a$ is a short tube having a flange, $b$, near one end, and the opposite end threaded to receive a steam-pipe.

$c$ is a tube having a flange, $d$, about midway its length, threaded at one end, and having its opposite end adapted to slide within tube $a$.

$e$ is a stuffing-box to prevent the escape of steam between tubes $a$ and $c$.

$f$ is a spiral spring placed between flange $d$ and the gland of stuffing-box $e$.

For the purpose of allowing an independent rotary movement of tubes $a$ and $c$ without twisting spring $f$, the ends of said spring are secured, respectively, to washers $g$ and $h$.

$i$ is a cylindrical case formed in two parts, each having a stuffing-box, $j$ and $k$, which fit the tubes $a$ and $c$, respectively. The two parts are united by screwing one into the other at $l$.

In operation one of the two pipes to be coupled is screwed into tube $a$ and the other into tube $c$. Each of said tubes being free to turn independently in the case $i$, right-hand threads may be used on both pipes. The gland $m$ of stuffing-box $e$ is held closely to its place by spring $f$. As the pipes expand on the admission of steam, tube $c$ slides into tube $a$, and both slide toward each other in case $i$. Such movement compresses spring $f$, and thereby tightens the packing in stuffing-box $e$. If any steam should escape between pipes $a$ and $c$, it is prevented from escaping from case $i$ by the stuffing-boxes $j$ and $k$.

I claim as my invention—

In a pipe-coupling, tubes $a$ and $c$, joined by sliding one within the other, stuffing-box $e$, closing said joint, spiral spring $f$, arranged to abut against the gland of said stuffing-box and against flange $d$ on tube $c$, whereby said spring is compressed and the stuffing-box tightened by the sliding of the tubes together, and case $i$, inclosing said stuffing-box and spring, all combined and arranged to co-operate substantially as and for the purpose specified.

FRED L. McGAHAN.

Witnesses:
H. P. HOOD,
A. M. HOOD.